United States Patent
Gallone

Patent Number: 5,322,370
Date of Patent: Jun. 21, 1994

[54] LINEAR SLIDING GUIDES WITH ROLLING ELEMENTS FOR TRANSLATING COUPLINGS

[75] Inventor: Fiorenzo Gallone, Milan, Italy

[73] Assignee: T.M.T. Transmissioni Meccaniche Torino S.R.L., Milan, Italy

[21] Appl. No.: 8,697

[22] Filed: Jan. 25, 1993

[30] Foreign Application Priority Data

Jan. 12, 1993 [IT] Italy .......................... MI93 U 000020

[51] Int. Cl.$^5$ .............................................. F16C 29/04
[52] U.S. Cl. ........................................ 384/49; 384/51; 384/55; 384/625
[58] Field of Search ...................... 384/47, 49, 50, 53, 384/55, 492, 625

[56] References Cited

U.S. PATENT DOCUMENTS

| | | | |
|---|---|---|---|
| 4,593,957 | 6/1986 | Hidano | 384/49 |
| 4,623,201 | 11/1986 | Gallone | 384/53 |
| 4,629,260 | 12/1986 | Kasai | 384/49 |
| 4,655,613 | 4/1987 | Yokota | 384/49 |
| 4,941,197 | 7/1990 | Roeser | 384/44 |
| 5,022,768 | 6/1991 | Baxter | 384/51 X |

Primary Examiner—Thomas R. Hannon
Attorney, Agent, or Firm—Oblon, Spivak, McClelland, Maier & Neustadt

[57] ABSTRACT

Linear sliding guides with rolling elements for translating couplings or the like, which include by a pair of contoured elements suitable for being fitted one with the other wherein rolling elements are interposed between the contoured elements, and wherein both of the contoured elements are provided with seats for at least partially housing the rolling elements. The rolling elements are retained by an intermediate cage element. Inside the seats the contoured elements have at least one mutually opposite face treated by high-thickness hard anodizing. The rolling elements are made of a plastic material and the contoured elements are manufactured from an extruded light alloy material.

9 Claims, 2 Drawing Sheets

LINEAR SLIDING GUIDES WITH ROLLING ELEMENTS FOR TRANSLATING COUPLINGS

BACKGROUND OF THE INVENTION

1. Field of the Invention

The present invention relates to linear sliding guides with rolling elements for translating couplings and similar structure.

2. Discussion of the Background

In general, the traditional linear sliding guides, or similar devices, as developed and manufactured heretofore use at least two steel contoured elements, hardened, and possibly ground, at least partially at their guide surfaces and recessed seats which act as the races for the steel balls or rollers. This structure was resorted to in order that the hardness values could be reached which are necessary for withstanding the high specific pressures which the also hardened steel balls or rollers apply to said seats.

If, on the one hand, they offer high load supporting capabilities, said mutually opposite contoured elements, on the other hand, slide into each other, owing to the nature of the material which constitutes them, and require the constant presence of a lubricating grease or oil, in order to prevent the arising of sliding problems.

Furthermore, linear sliding guides with such contoured elements display the drawback of generating a considerable amount of noise due to their nature and due to the construction of their parts.

Moreover, although they may be provided with elements which perform the task of keeping the sliding races or seats free from possible impurities before contact with the balls takes place, said guides, in not particularly clean environments, are affected by operating problems and useful life limitations.

Still furthermore, the above cited linear sliding guides are considerably expensive owing to the treatments the various parts, including the balls, have to be submitted to, and certain problems are also caused by the weight of the steel parts.

SUMMARY OF THE INVENTION

An object of the present invention is to provide linear sliding guides with rolling elements for translating couplings or the like, which make it possible to overcome all of the above problems.

Another object is to provide linear sliding guides at an extremely low cost, which additionally are extremely noise free and light-weight.

These objects according to the present invention are achieved by providing linear sliding guides with rolling elements for translating couplings or the like, constituted by a pair of contoured suitable elements for being slid with respect to each other via the interpositioning of rolling elements, with both of said contoured elements being provided with seats for at least partially housing said rolling elements, which are retained by an intermediate cage element, characterized in that each of said contoured elements displays at least one mutually opposite face treated by thick hard anodizing and said rolling elements are made of a plastics material.

The contoured elements are manufactured from an extruded light alloy material.

BRIEF DESCRIPTION OF THE DRAWINGS

The characteristics and advantages of sliding guides according to the present invention will be better understood from the following exemplifying, nonlimitative disclosure made by referring to the accompanying schematic drawings in which.

DESCRIPTION OF THE PREFERRED EMBODIMENTS

Figure 1:
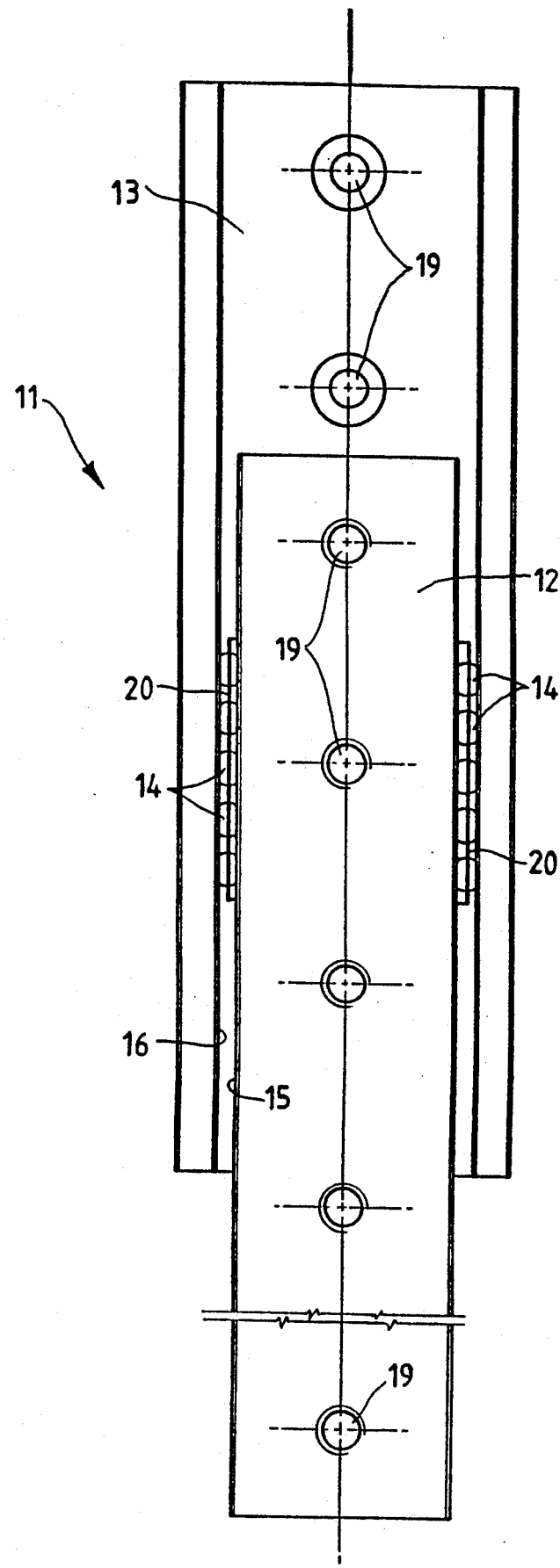
FIG. 1 shows a top plan view of linear sliding guides according to the present invention.

Referring to FIG. 1, linear sliding guides with rolling elements for translating couplings or the like according to the present invention are shown and are generally indicated by reference number 11 and are essentially constituted by one pair of contoured elements 12, 13, which can be slid with respect to each other by the interposition of rolling elements 14, such as balls.

The internal and external contoured elements 12 and 13 respectively, are made, e.g., of an extruded precision profile of light allow with mutually opposite surfaces 15 and 16, i.e., the surfaces on which the rolling elements slide (i.e., rolling element sliding surfaces) 14 are deep-hardened (from 50 to 100 microns) by means of a treatment of high-depth hard anodizing. Said contoured elements display two shapes: an internal one which is of an elongated prismatic shape; and an external one which has a flattened-"C"-shaped cross section partially embracing said first, internal element 12.

Both of said contoured elements 12 and 13 are provided on their mutually opposite surfaces 15, 16 with longitudinal recesses 17, 18 acting as seats or races and perform the task of at least partially housing and guiding the rolling elements 14 for mutual sliding of the parts.

Through body of the both the first, internal contoured elements 12 and of the second, external contoured element 13, through-bores 19 are provided in a parallel direction to the direction of the side surfaces 15, 16, in order to house fastening elements for the respective contoured elements, and/or accessory elements, not shown in the figures, which are supported and borne by them.

Figure 3:
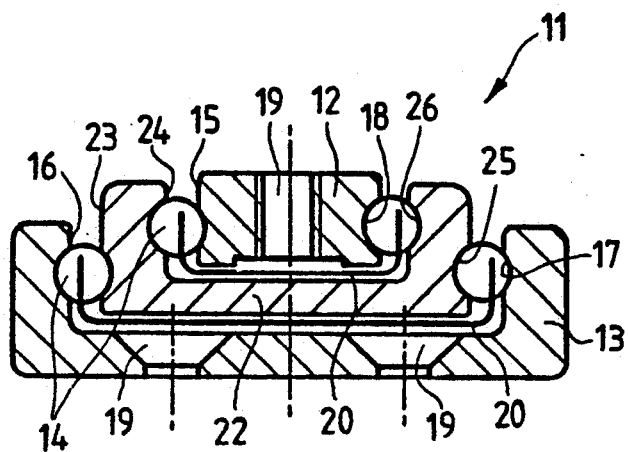
FIG. 3 shows a cross section of a second embodiment of linear sliding guides according to the present invention.
Figure 2:
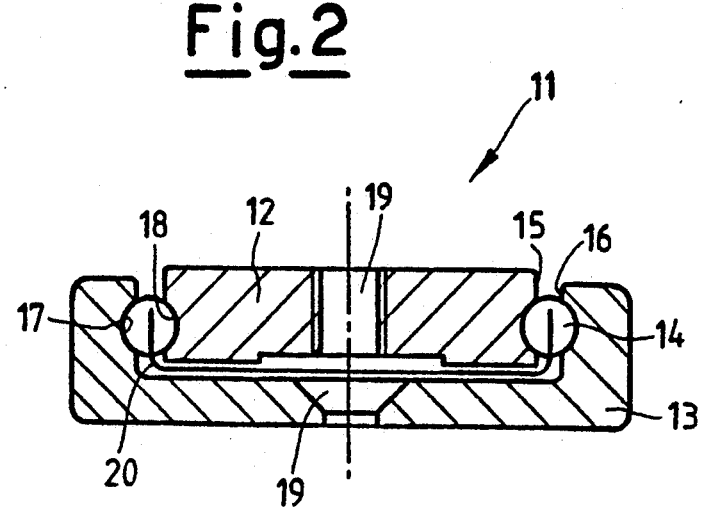
FIG. 2 shows a cross section of the linear sliding guides of FIG. 1.

In an intermediate zone between the contoured elements 12, 13, i.e., between the mutually opposite surfaces 15, 16 an intermediate cage element 20 is provided which extends, between opposite lateral sides of the second element 12 as shown in FIGS. 2 and 3. In this manner, the rolling elements are retained in their correct position relatively to each other, as well as relatively to the mutually opposite longitudinal grooves 17, 18 and their mutual sliding movement between both the internal and external contoured elements 12 and 13, respectively is allowed.

According to the geometry of the selected system, said balls 14 are made, according to the present invention, of plastics materials, such as, e.g., polyamide 6—6, possibly respectively filled with fiberglass, carbon fibres and/or molybdenum disulfide. Other materials useful for constructing the rolling bodies can be polyacetates, polypropylene, polytetrafluoro-ethylene, polyurethane, as well.

FIG. 3 shows a second exemplifying embodiment of linear sliding guides according to the invention in which, in additional to the contoured elements 12, 13, a third contoured element 22 is provided. According to this embodiment, both contoured elements 13, 22 have a flattened-"C"-shaped cross-section, with the size of the cross section of the former contoured element 13 being larger than the size of the cross section of the latter contoured element 22, so that the internal contoured element 22 can be contained inside the contoured element 13.

Also the third contoured element 22 displays opposite side surfaces 23 and 24 which are deep-hardened (from 50 to 100 microns) by high-depth hard anodizing. Furthermore, on its side surfaces 23, 24, said element is provided with longitudinal grooves 25, 26, which act as races or seats and are suitable for at least partially housing and guiding, in cooperation with the grooves 17 and 18, two sets of rolling elements 14. The internal contoured element 12, of prismatic shape, will have a smaller size than the equivalent element of the first embodiment, and should be contained inside the contoured element 22.

In an intermediate zone between the contoured elements 12, 22 and also 22, 13, i.e., between the mutually opposite surfaces 15 and 24, and, respectively, 16 and 23, two intermediate cage elements 20 are provided. In this manner, said rolling elements 14 are retained in their mutually correct position, also relatively to the mutually opposite longitudinal grooves 18, 26 and 17, 25 respectively, and the mutual sliding movement of both the internal and the intermediate contoured elements 12, 22 and the intermediate and the external contoured elements 22, 13, respectively, is allowed.

According to this embodiment, telescopic guides are obtained which are particularly simple from the structural view point and are advantageous as regards their manufacturing and maintenance costs.

According to an alternative embodiment of the examples shown, some steel balls may be added between the plastics balls 14, as a safety element in the case of a great overload, in order to prevent the saddle from transversely exiting the rail.

The method of operation of the linear sliding guides of the present invention, according to any of the above embodiments is easily understood and is similar to the method of operation of linear sliding guides already known in the art.

In fact, the surfaces treated by high-depth hard anodizing display features which may offer important application advantages.

For example, when these guides are used in welding facilities, due to the material which constitutes the surface layer generated by the treatment having a melting point of 2000° C., said material is capable of acting as a exposure to heat shield against sudden heat such as might occur when the contoured element is struck by incandescent welding spatter.

In fact, by means of the structure of the present invention, spatter is quenched and falls down without damaging the contoured element.

Furthermore, the surface layer produced by the above treatment is an extremely good electrical insulation also in the presence of high voltage currents (1500 V).

Still furthermore, inasmuch as this treatment offers very good resistance to chemicals and is absolutely unalterable in the presence of water, it follows that the proposed guides display considerably high usefulness levels, not achievable by means of other technological solutions wherever the mechanical system cannot be isolated by the aggressive working atmosphere.

A standard solution which can be imagined for the guides might include the direct use of the precision extrudate, i.e., an extruded profile with dimensional tolerances on the order of some tenths of a millimeter and angular deflection tolerances which may reach values of around 1 mm per meter of rail length.

In some cases, such precision does not reach the required levels. In that case, the adoption of further technical measures tending to improve the precision may be contemplated.

A first technical measure consists of submitting the guide to a cold rolling operation performed on the ball and/or roller sliding races and on the support base, in order to obtain tolerances, on the cross section, falling within ISO h9 class. Of course, this operation should be carried out before the surface hardening treatment.

A second measure consists in submitting the contoured element to a roll forming (reeling) operation suitable for obtaining a tolerance level, on the cross section, within ISO h7 class; also this operation should be carried out before the surface hardening treatment.

A third measure consists in grinding the sliding races of a contoured element obtained by means of either of the above technical measures, in order to obtain a precision ranging within ISO h7-h4 classes. Contrary to the above, this operation should be carried out after the hardening treatment.

As regards the plastics material of the balls, it should be observed that it is a good electrical insulating material.

A sliding system results which is very interesting and advantageous wherever possible stray currents might cause damage to the facilities.

As stated, the balls or, possibly, the rollers, can be made with the suitable shape and be made from the proper material for that particular application the sliding unit according to the intended use.

The choice of the most suitable material will be defined as a function of the operating conditions, of the applied loads, of the translational speeds, of the aggressive agents and of the operating temperatures the sliding guides are exposed to.

By means of a linear sliding guide according to the present invention, the highly innovative level of the product is evidenced, which is a consequence of the material technologies and of the relevant product construction processes—these being technical solutions absolutely unusual within the scope of the sliding guide systems presently existing on the market which, even if display a similar geometry, are based on different, at all traditional and widely known constructional technologies.

By means of the provision of such an innovation, applicative possibilities are opened which were unfeasible heretofore.

Another very important advantage is the saving which, thanks to the use of these guides, can be achieved in machine construction, wherever, owing to cost reasons, the use of the traditional products cannot be even taken into consideration.

The noise characteristics and the capability to dampen the vibrations offered by this system can be conclusive and, in some cases, may be regarded as essential features, for the purposes of the selection.

For example, the application of linear sliding guides according to the present invention on automobile seats is mentioned.

In this application, above all in those cases in which the seat movement is driven by servomotors, a very small starting torque, i.e., a very low starting friction value is required. In view of the above, the coupling according to the present invention of the contoured elements of light alloy with high-depth hard anodizing and plastics balls makes it possible to obtain extremely good results.

As previously said, in order to secure a sure constraint between the contoured element fastened to the body of the vehicle, and the complementary contoured element fastened to the seat, also in the case of strong stresses, such as, e.g., impacts in the case of a road accident, inserting some steel balls may prove advisable. In fact, in order to be sure that the constraint will be retained even if the parts are submitted to strong stresses tending to disengage them from each other, steel balls or, anyway, metal bodies of suitable geometry and size are inserted. These metal bodies are not prone to the deformations which might be experienced by the plastics balls, preventing any risks of guide disengaging according to a cross direction to their length.

The metal balls and/or bodies preferably are with such a dimensional tolerance that they may come into contact with both guides simultaneously only after the deformation of the plastics balls has taken place owing to a violent stress.

In the following, the existence is demonstrated of a large number of possible uses of linear sliding guides having the characteristics of the present invention. However, no considerations exist in principle, which might limit the range of their possible uses.

A linear sliding guide according to the present invention can be advantageously used also when the following needs/requirements/conditions exists:
the need for cheaper solutions;
quiet operation is required;
there is a need for withstanding polluting agents, however without that, protecting systems are systems can be installed;
the product is required to operate in the presence of water of chemically aggressive solutions;
an adequately cheap product with limited loading capabilities is required; this condition exists wherever this type of sliding guide performs a task, but traditional steel solutions are excessively strong and precise, and too expensive;
there is a need for a light weight sliding guide, an aim which is surely achieved with the light alloy ball guide rails and cage;
in those cases in which the presence of lubricants is absolutely not tolerated and therefore a system is required which is inherently self-lubricating thanks to the nature of the materials which comprise it, such as plastics materials which contact with the hardened surface obtained by means of the special treatment of high-depth hard anodizing.

According to an alternative embodiment, the rolling elements may be made of steel, e.g., as balls and/or rollers, so as to offer high safety in the case of overloads. Such an application is particularly suitable for the sliding of motor vehicle seats.

Obviously, numerous modifications and variations of the present invention are possible in light of the above teachings. It is therefore to be understood that within the scope of the appended claims, the invention may be practiced otherwise than as specifically described herein.

I claim:

1. Linear sliding guides for translating couplings which comprise:
   first and second contoured elements wherein the second element is positioned in the first element wherein each of said contoured elements include rolling elements and seats for at least partially housing said rolling elements;
   an intermediate cage element for retaining said rolling elements and which extends between rolling elements on opposite lateral sides ends of said first and second contoured elements, wherein said first and second contoured elements comprise a light alloy material and wherein said first and second contoured elements have mutually opposed high-thickness, hard anodized faces, and said rolling elements are made of a plastic material.

2. Linear sliding guides according to claim 1, wherein said contoured elements comprise extruded elements.

3. Linear sliding guides according to claim 1, wherein said first contoured comprises an external element which has a flattened C-shaped cross section which partially embraces said second contoured element and said second element comprises an internal element.

4. Linear sliding guides according to claim 3, which comprises at least one, intermediate, contoured element provided between said first and second elements, which has a flattened "C"-shaped cross section.

5. Linear sliding guides according to claim 1, wherein said rolling elements comprise balls.

6. Linear sliding guides according to claim 1, which comprise sliding races provided on said mutually opposed surfaces of said contoured elements, wherein said sliding races are complementary with each other.

7. Linear sliding guides according to claim 1, wherein said rolling elements comprise plastic material reinforced with one of fiberglass and carbon fibers, and/or are filled with molybdenum disulfide.

8. Linear sliding guides according to claim 1, wherein said first and second contoured elements have fastening holes formed therein.

9. Linear sliding guides with holding elements for translating couplings which comprise:
   first and second contoured elements which have rolling elements for sliding of said second element within said first element, wherein each of said first and second contoured elements have seats for at least partially housing said rolling elements; and
   an intermediate cage element for at least partially housing said rolling elements, said intermediate cage extending between rolling elements on opposite lateral sides of the second contoured element wherein said first and second contoured elements have at least one mutually opposite face which has a high-thickness, hard anodized surface and, said rolling elements comprise steel and wherein said first and second contoured elements comprise a light alloy material.

* * * * *